United States Patent
Botu et al.

(10) Patent No.: US 12,072,529 B2
(45) Date of Patent: Aug. 27, 2024

(54) OPTICAL WAVEGUIDES AND METHODS FOR PRODUCING

(71) Applicant: CORNING INCORPORATED, Corning, NY (US)

(72) Inventors: Venkatesh Botu, Corning, NY (US); Ming-Jun Li, Horseheads, NY (US); William James Miller, Horseheads, NY (US)

(73) Assignee: CORNING INCORPORATED, Corning, NY (US)

( * ) Notice: Subject to any disclaimer, the term of this patent is extended or adjusted under 35 U.S.C. 154(b) by 205 days.

(21) Appl. No.: 17/779,395

(22) PCT Filed: Nov. 20, 2020

(86) PCT No.: PCT/US2020/061414
§ 371 (c)(1),
(2) Date: May 24, 2022

(87) PCT Pub. No.: WO2021/108235
PCT Pub. Date: Jun. 3, 2021

(65) Prior Publication Data
US 2022/0413220 A1     Dec. 29, 2022

(51) Int. Cl.
| | |
|---|---|
| *G02B 6/136* | (2006.01) |
| *C03C 17/02* | (2006.01) |
| *G02B 6/122* | (2006.01) |
| *G02B 6/12* | (2006.01) |

(52) U.S. Cl.
CPC ............. *G02B 6/136* (2013.01); *C03C 17/02* (2013.01); *G02B 6/1223* (2013.01); *G02B 2006/12038* (2013.01)

(58) Field of Classification Search
None
See application file for complete search history.

(56) References Cited

U.S. PATENT DOCUMENTS

| | | |
|---|---|---|
| 3,922,062 A | 11/1975 | Uchida |
| 5,858,051 A | 1/1999 | Komiyama et al. |
| (Continued) | | |

FOREIGN PATENT DOCUMENTS

| | | |
|---|---|---|
| EP | 0571924 A1 | 12/1993 |
| JP | 62-204207 A | 9/1987 |
| (Continued) | | |

OTHER PUBLICATIONS

G.C. Righini and A. Chiappini, "Glass optical waveguides: a review of fabrication techniques" Optical Engineering 53 (7), 071819 (Jul. 2014) 15 pgs.

(Continued)

*Primary Examiner* — Rhonda S Peace (57) ABSTRACT

A process for forming glass planar waveguide structure includes producing or obtaining a fusion drawn glass laminate (10) comprising a core glass layer (10) and a first clad glass layer (14) and a second clad glass layer (16) then removing or thinning portions of at least the second glass clad layer (16) leaving remaining or thicker portions of the second glass clad layer (16), the remaining or thicker portions corresponding to a planar waveguide pattern and resulting in a glass planar waveguide structure.

20 Claims, 5 Drawing Sheets

(56) References Cited

U.S. PATENT DOCUMENTS

2014/0238078 A1* 8/2014 Boek .................... C03C 21/002
                                                                                 65/33.2
2022/0413220 A1* 12/2022 Botu .................... G02B 6/1223

FOREIGN PATENT DOCUMENTS

| WO | 2018/013505 A1 | 1/2018 |
| WO | 2018/013506 A1 | 1/2018 |

OTHER PUBLICATIONS

International Search Report and Written Opinion of the International Searching Authority; PCT/US20/61414; Mailed Feb. 19, 2021; 12 Pages; European Patent Office.

* cited by examiner

OPTICAL WAVEGUIDES AND METHODS FOR PRODUCING

CROSS-REFERENCE TO RELATED APPLICATIONS

This application claims the benefit of priority under 35 U.S.C. § 371 of International Application No. PCT/US2020/061414, filed on Nov. 20, 2020, which claims the benefit of priority under 35 U.S.C. § 119 of U.S. Provisional Application No. 62/942,130, filed Nov. 30, 2019, the content of each of which are incorporated herein by reference in their entirety.

FIELD

The disclosure relates generally to generally planar optical waveguides and methods for producing such, and more specifically to generally planar optical waveguides comprising fusion drawn laminated (and fused) glass and methods for producing generally planar optical waveguides using fusion drawn laminated (and fused) glass.

BACKGROUND

As the performance of microprocessors continues to increase, the maximum available data communication rate of electrical interconnects used for data flow to and from microprocessors becomes a more and more dominant bottleneck limiting overall system performance. Replacing electrical interconnects with optical interconnects can resolve this bottleneck issue. The most important advantages of optical interconnects are higher bandwidth-length product (i.e., higher relative bandwidth measured as bandwidth multiplied by length) and higher density. Cost and power savings can also be achieved. In addition to these advantages, optical interconnects also offer the possibility of embedding optical alignment solutions directly within the interconnects.

Planar waveguides are promising components for use in optical interconnects, currently under considered for applications in computer interconnects such as chip to chip optical array connections.

There are three main approaches for making planar waveguides for chip interconnects using relatively low-cost glass as the material. One is to deposit thin film with higher refractive index on top of a glass substrate, for example by a sol gel spin coating process or chemical vapor deposition process. The channel waveguides are then made by a photolithography and chemical etching process. A second is to use an ion-exchange process through a mask to create channel waveguides, for example by K+—Na+ ion-exchange, or by Ag+—Na+ ion-exchange within a glass substrate. A third is to write waveguides directly on or in a glass substrate using UV or IR laser. Each of these processes has respective limitations in terms of scalability and flexibility, and is thus is hard to adapt for low cost manufacturing. Accordingly, it is desirable to establish a process for producing high quality low cost planar waveguides in glass.

SUMMARY

According to methods or processes disclosed herein, a glass planar waveguide structure is formed by producing or obtaining a fusion drawn glass laminate comprising a core glass layer and a first clad glass layer and a second clad glass layer, then removing or thinning portions of at least the second glass clad layer leaving remaining or thicker portions of the second glass clad layer, the remaining or thicker portions arranged or positioned in a planar waveguide pattern and resulting in a glass planar waveguide structure.

The process can additionally include removing or thinning portions of the first glass clad layer leaving remaining portions of the first glass clad layer arranged or positioned in a planar waveguide pattern, resulting in a dual-sided glass planar waveguide structure.

Any above variation of the processes disclosed herein can include removing portions of the second glass clad layer by etching with an etch process that selectively etches the second glass clad layer relative to the core glass layer.

Any above variation of the processes disclosed herein can also employ producing or otherwise obtaining a fusion drawn glass laminate having a difference of index of refraction between the second glass clad layer and the core glass layer of in the range from 0.1 to 5%. The core glass can have a higher index of refraction than the second clad glass layer, desirably so in most embodiments. In some embodiments, the core glass layer can have a lower index of refraction than the second clad glass layer.

Any above variation of the processes disclosed herein can employ producing or otherwise obtaining a fusion drawn glass laminate having a length L, a width W and wherein the length L and the width W are in the range of 1 cm to 50 cm.

Any above variation of the processes disclosed herein can also employ removing or thinning portions of the second glass clad layer by leaving remaining or thicker portions of the second glass clad layer having a width W, wherein the width W of the remaining or thicker portions is within the range of from 2 um to 100 um. The remaining or thicker portions of the second glass clad layer can include multiple remaining or thicker portions extending in parallel in a direction generally perpendicular to the with W wherein the number of said multiple remaining or thicker portions is in the range of from 4 to 300.

Any above variation of the processes disclosed herein can also employ producing or otherwise obtaining a fusion drawn glass laminate having a thickness T wherein the thickness T is between 100 um to 2 mm.

Any above variation of the processes disclosed herein can also employ producing or otherwise obtaining a fusion drawn glass laminate comprises producing or otherwise obtaining a fusion drawn glass laminate having a thickness T wherein the thickness T is between 100 um to 500 um such that the resulting planar waveguide structure is flexible.

Any above variation of the processes disclosed herein can also employ adding a layer of material over the remaining or thicker portions of the second glass clad layer, the material having an index contrast with the second glass clad layer, to produce a buried waveguide.

According to embodiments, a planar waveguide or flexible planar waveguide is disclosed comprising a fusion drawn glass laminate having a planar core layer and a first clad layer and a second clad layer fused together with the first and second clad layers forming respective first and second major surfaces of the laminate with at least the second clad layer having a pattern of absent or thinned areas and corresponding remaining or thick areas so as to be able to guide one or more wavelengths along waveguides resulting from the remaining or thick areas.

Additional embodiments and various advantages will be apparent from the description, figures, and claims below.

DETAILED DESCRIPTION

Figure 1:
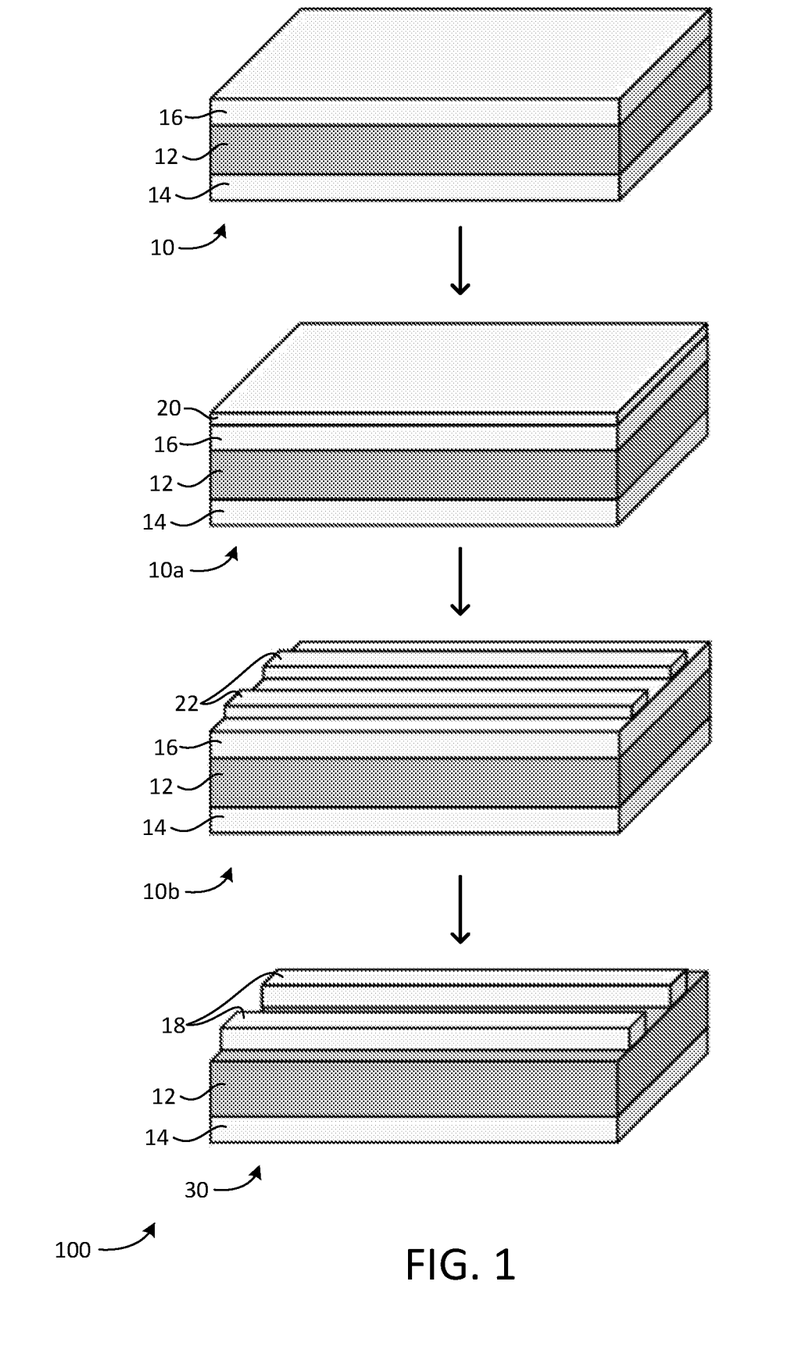
FIG. 1 is a three-dimensional diagrammatic view depicting an embodiment of a process according to the present disclosure for forming generally planar waveguides on laminated glass substrates produced by fusion draw, and resulting waveguides.

FIG. 1 a three-dimensional diagrammatic view depicting an embodiment of a process 100 according to the present disclosure for forming generally planar waveguides on laminated glass substrates produced by fusion draw, and resulting waveguides. A laminated glass substrate 10 is be made by a fusion draw process with a core glass layer 12 and first and second clad glass layers 14, 16. The core and clad glass layers form a glass laminate in which the layers are fused together during the fusion draw process, and so there is no adhesive or other material used or needed to adhere the layers together. Use of a fusion draw process to form the laminated substrate 10 allows production of uniform (high quality) laminated glass at low cost.

To make the waveguides, a photoresist 20 is deposited on a surface of the second clad layer 16, resulting in a laminated substrate with photoresist 10a. Then the photoresist 20 is exposed to UV light through a photomask (not shown) having a waveguide pattern, or is otherwise exposed in the waveguide or the negative thereof. Then the UV exposed regions of photoresist are removed (or, alternatively, the non-exposed regions are removed) by using a developer to form a photoresist mask 22, resulting in a masked laminated substrate 10b. The exposed regions (the areas not protected by the photoresist mask 22) of the second clad layer 16 are then removed by etching, desirably by an anisotropic etching, resulting in waveguides 18 on a laminated waveguide substrate 30. For particularly small features (<50 um) an additional metal mask (not shown) (a CrON mask, for example) can be used to provide a protective layer strongly resistant to the etching medium. In an alternative embodiment or variation, the chemistry of the etch process and the composition of the clad and core layers can be chosen such that the etch selectively etches the clad relative to the core, such that the core layer can serve, at least to some degree, as an etch-stop layer during the etching step.

Figure 2:
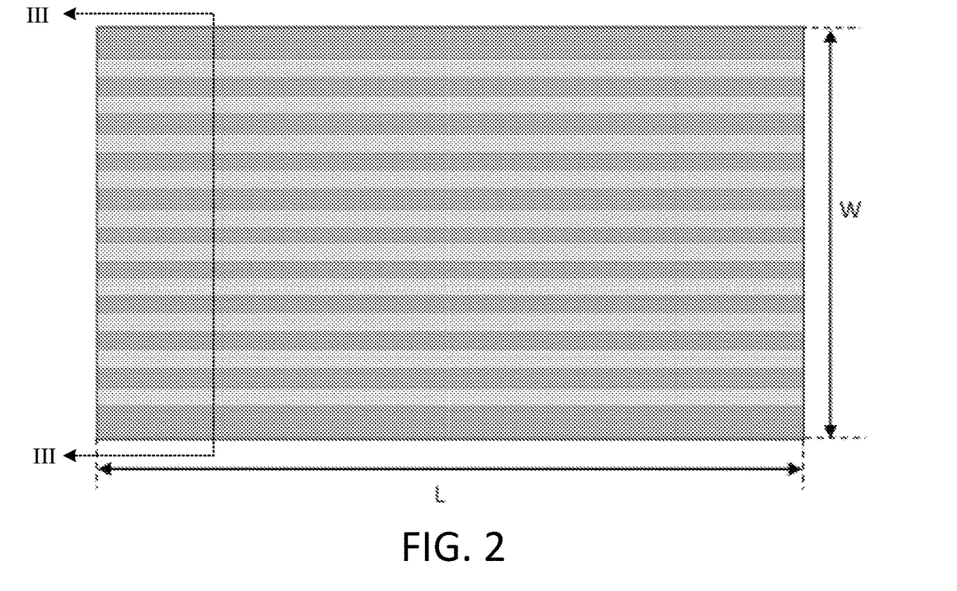
FIG. 2 is a plan diagrammatic view of a waveguide array according to an embodiment of the present disclosure and produced according to methods of the present disclosure.
Figure 3:
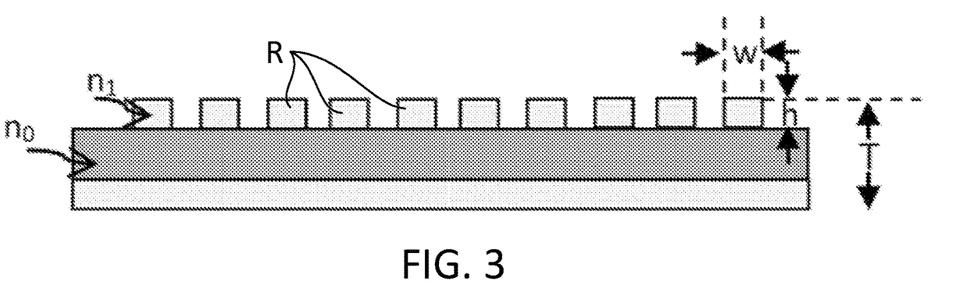
FIG. 3 is a cross-sectional diagrammatic view of the array, or a section of the array, of FIG. 2.
Figure 4:
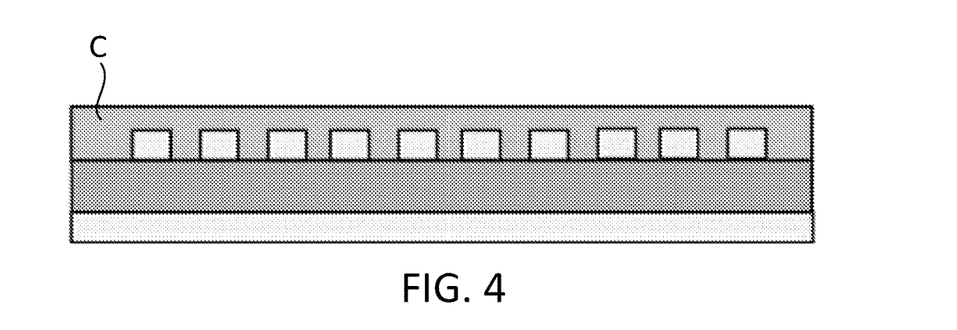
FIG. 4 is a cross-sectional diagrammatic view of the array, or a section of the array, of FIG. 2 after addition of material to form a buried waveguide array.

FIG. 2 is a plan diagrammatic view of a waveguide array according to an embodiment of the present disclosure and produced according to methods of the present disclosure, and FIG. 3 is a (partial) cross-sectional view thereof taken along the line indicated in FIG. 2. The laminated glass substrate has a length L, a width W and a thickness T. The length L and width W are in the range of 1 cm to about 50 cm. The thickness T is between 100 um to 2 mm. The waveguides can be made by selectively removing regions of second clad layer 16 (or top layer in the orientation shown) of the laminated glass substrate, to form "channel" ridges R as shown in FIG. 3. The resulting channel waveguides can be single mode or multimode. The relative index change $\Delta$ of waveguide relative to the core layer can be between 0 and 5% or between 0.1 and 5%. The dimension of the width W of the waveguide (the width W of the ridge R) is between 2 um to 100 um. The waveguides can be made and can remain on the surface of the glass substrate as shown in FIG. 2. For parallel waveguides, the waveguide spacing, center-to-center, is desirably between 10 um to 100 um to ensure desirably low crosstalk between neighboring waveguides, more preferably the waveguide spacing is between 30 um and 50 um. A larger number of waveguides can be put in one substrate. For example, 4, 8, 10, 16, 20, 24, 48, 96, 100, 124, 150, 200, even 300 or more. The waveguides can optionally be buried by a coating layer C on the waveguides as shown in FIG. 3. The coating layer C can be glass or polymer, for example, and results in a buried waveguide structure.

Figure 5:
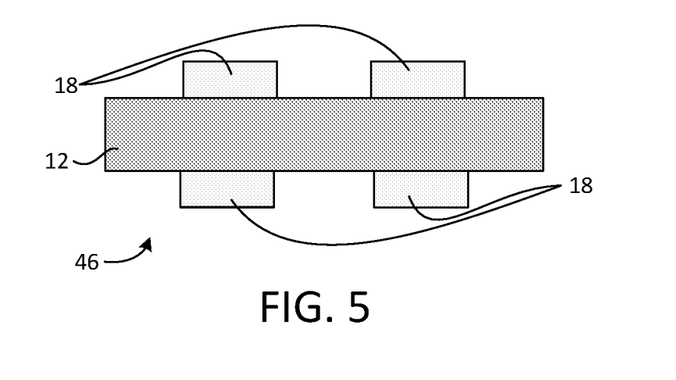
FIGS. 5, 6, and 7 are cross-sectional views of embodiments of additional types of waveguides according to the present disclosure, produced according to additional embodiments of the methods of the present disclosure.
Figure 6:
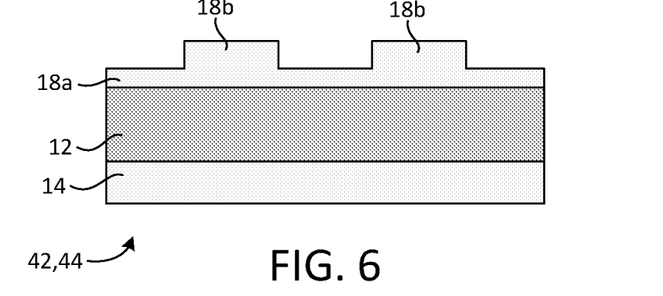
Figure 7:
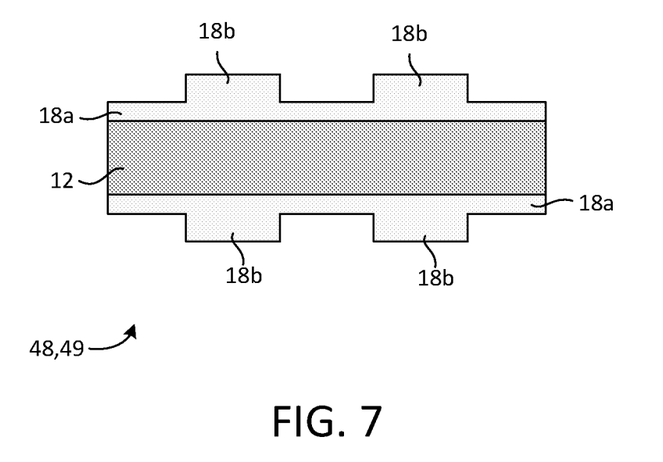

FIGS. 5, 6, and 7 are cross-sectional views of embodiments of additional types of waveguides according to the present disclosure, produced according to additional embodiments of the methods of the present disclosure. As shown in the cross section of FIG. 5, waveguides 18 may be formed from both the upper and lower (second 16 and first 14 in FIG. 1) clad layers, resulting in a laminated (fusion) glass substrate 46 with optical waveguide devices on two surfaces (i.e., on both major [opposing] surfaces). As shown in the cross section of FIG. 6, waveguide types other than ridge waveguides can also be formed, for example, by not etching the clad layer completely away, such as rib waveguides (indicated by 18a and 18b) on a laminated (fusion) glass substrate 42, or if the index relations are reversed (and indexes and dimensions appropriately selected), ARROW (Anti-Resonant Reflecting Optical Waveguide) waveguides on a laminated (fusion) glass substrate 44. These and other types may also be formed on both (major) surfaces of the laminated fusion glass substrate, resulting, for example, in two sides (two sets) of rib waveguides on a laminated (fusion) glass substrate 48, or two sides (two sets) ARROW waveguides on a laminated (fusion) glass substrate 49, depicted in FIG. 7.

Figure 8:
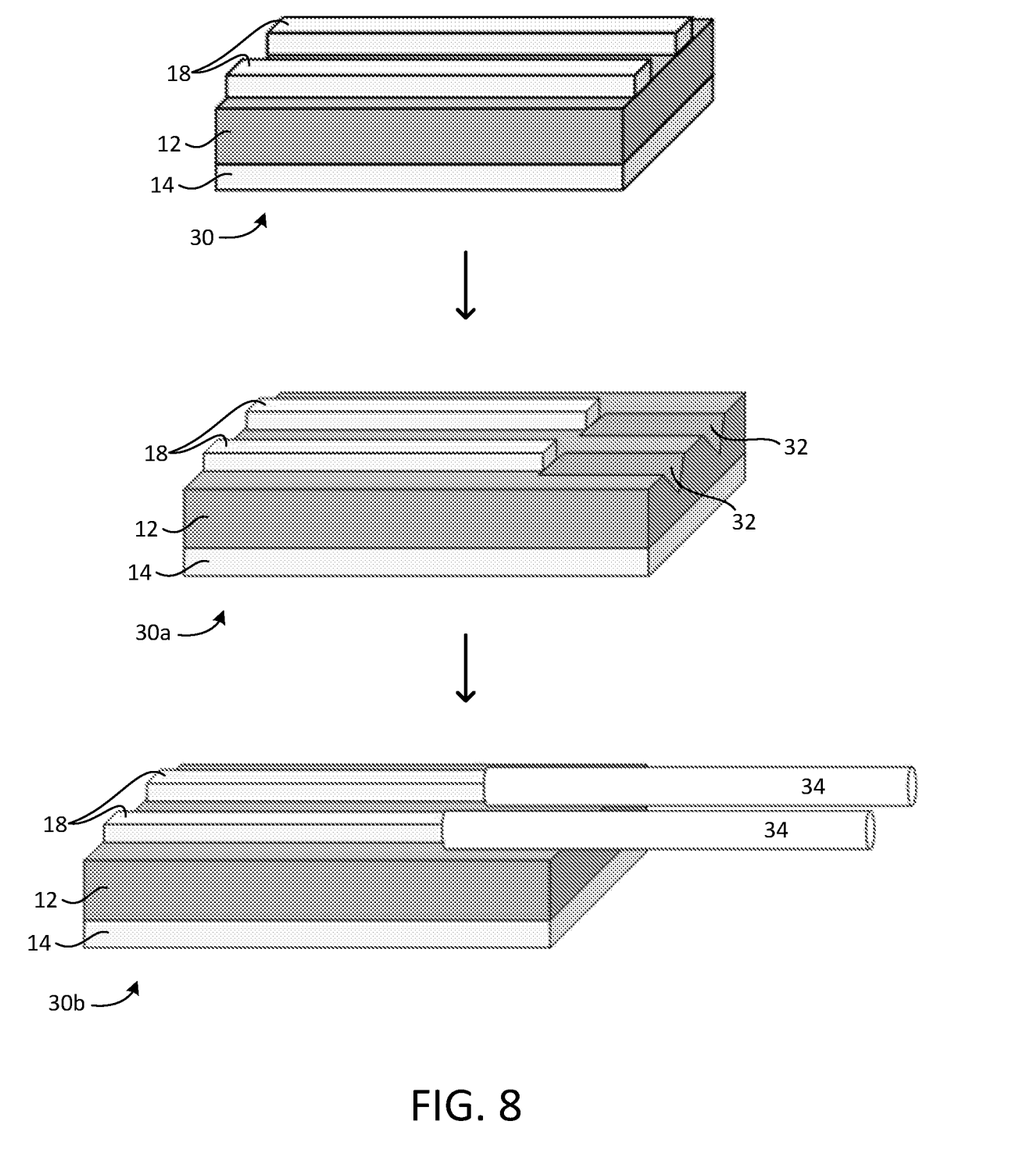
FIG. 8 is a three-dimensional diagrammatic view depicting an embodiment of a process according to the present disclosure for aligning optical fibers to waveguides produced by methods according to the present disclosure, and resulting aligned waveguides and fibers.

FIG. 8 is a three-dimensional diagrammatic view depicting an embodiment of a process according to the present disclosure for aligning optical fibers to waveguides produced by methods according to the present disclosure, and resulting aligned waveguides and fibers. For optical interconnect applications, it is generally important to couple planar waveguides to optical fibers. For fiber to waveguide coupling, good alignment of optical fiber to waveguide is needed to achieve low insertion loss. For waveguides on a laminated glass substrate, alignment V-grooves can be formed on the laminated fusion glass substrate 30 as shown in FIG. 8, in alignment with the remaining or thicker portions of the second glass clad layer 16 (the waveguides 18). Waveguides 18 can be removed or simply not formed in the areas where V-grooves 32 are to be formed, and V-grooves 32 can be formed by masking such as photolithographic masking, together with an isotropic etching process, producing waveguides with alignment V-grooves on a fusion glass substrate 30a. To couple fibers to the waveguides, fibers 34 are then placed into the V-grooves 32 to align the fibers to the waveguides 18. Then the fibers 34 are secured in place, such as with epoxy or other suitable means, to form waveguides with butt couplings to fibers on a fusion glass substrate 30b.

Figure 9:
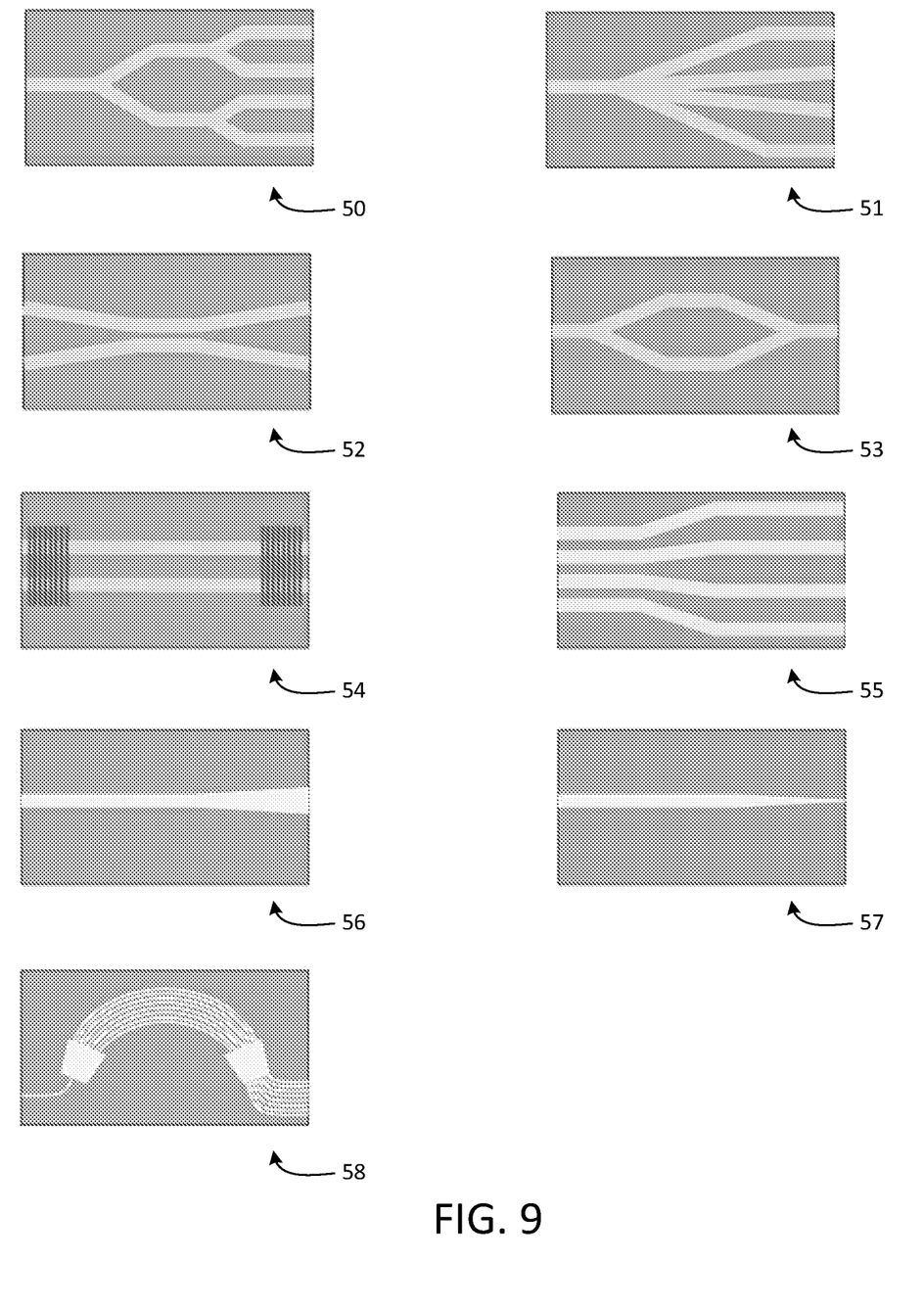
FIG. 9 is a diagrammatic plan view of embodiments of various types of generally planar optical devices embodying the waveguides of the present disclosure and usefully produced by the methods or processes of the current disclosure.

FIG. 9 is a diagrammatic plan view of embodiments of various types of generally planar optical devices embodying the waveguides of the present disclosure and usefully produced by the methods or processes of the current disclosure. In addition to parallel waveguides, many different devices can be made on laminated glass substrates for optical interconnect applications. FIG. 9 shows eight types of devices, including a Y-branch 50 for splitting an optical signal from one waveguide into multiple waveguides, or for combining optical signals from multiple waveguides into one waveguide when used in the reverse sense. A star-coupler 51 can be formed for performing similar functions. A directional coupler 52 can be formed, useful for coupling a signal from one waveguide to another. A Mach-Zehnder interferometer 53 can be formed and is useful for signal processing. A waveguide device 54 with grating couplers can be formed by placing or forming gratings in or on the remaining or thicker portions of the second glass clad layer e.g., the ridges R (the resulting waveguides) as shown, such as by an additional photolithography and chemical etching process such as discussed above, or by laser-writing or other suitable techniques. A waveguide fan-out device 55 can be formed, which device allows coupling between a waveguide array with relatively smaller spacing to a fiber array with relatively larger spacing. An inverse waveguide taper 56 can be formed which can enlarge the mode field to facilitates coupling between a waveguide with relatively smaller mode field to an optical fiber with a relatively larger mode field. A waveguide taper 57 can be formed, useful to couple a waveguide with a relatively larger dimension to a waveguide into a relatively smaller dimension. An arrayed waveguide grating device 58 can be formed for separating wavelength channels from waveguide, such as one fiber input for example, into individual wavelength channels which can each be coupled to respective individual fibers, if desired.

Although only a few embodiments have been described in detail in this disclosure, many modifications are possible (e.g., variations in sizes, dimensions, structures, shapes, and proportions of the various elements, values of parameters, mounting arrangements, use of materials, orientations) without materially departing from the novel teachings and advantages of the subject matter described herein. Some elements shown as integrally formed can be constructed of multiple parts or elements, the position of elements can be reversed or otherwise varied, and the nature or number of discrete elements or positions can be altered or varied. The order or sequence of any process, logical algorithm, or method steps can be varied or re-sequenced according to alternative embodiments. Other substitutions, modifications, changes and omissions can also be made in the design, operating conditions and arrangement of the various exemplary embodiments without departing from the scope of the present inventive technology.

What is claimed is:

1. A process for forming glass planar waveguide structure, the process comprising:
   producing or otherwise obtaining a fusion drawn glass laminate comprising a core glass layer and a first clad glass layer and a second clad glass layer;
   removing or thinning portions of the second clad glass layer leaving remaining or thicker portions of the second clad glass layer arranged in a first planar waveguide pattern; and
   etching V-grooves in alignment with one or more of the remaining or thicker portions of the second clad glass layer.

2. The process according to claim 1, further comprising removing portions of the first clad glass layer leaving remaining portions of the first clad glass layer arranged in a second planar waveguide pattern.

3. The process according to claim 1, wherein the removing portions of the second clad glass layer comprises etching with an etch process that selectively etches the second clad glass layer relative to the core glass layer.

4. The process according to claim 1, wherein the producing or otherwise obtaining the fusion drawn glass laminate comprises producing or otherwise obtaining the fusion drawn glass laminate having a difference of index of refraction between the second clad glass layer and the core glass layer of in the range from 0.1 to 5%.

5. The process according to claim 4, wherein the core glass layer has a higher index of refraction than the second clad glass layer.

6. The process according to claim 4, wherein the core glass layer has a lower index of refraction than the second clad glass layer.

7. The process according to claim 1, wherein the producing or otherwise obtaining the fusion drawn glass laminate comprises producing or otherwise obtaining the fusion drawn glass laminate having a length L and a width W, and wherein the length L and the width W are in a range of 1 cm to 50 cm.

8. The process according claim 1, wherein the removing or thinning portions of the second clad glass layer comprises leaving remaining or thicker portions of the second clad glass layer having a width W, and the width W of the remaining or thicker portions is in a range of from 2 um to 100 um.

9. The process according to claim 8, wherein the remaining or thicker portions of the second clad glass layer include multiple remaining or thicker portions extending in parallel in a direction generally perpendicular to the width W, and wherein a number of said multiple remaining or thicker portions is in a range of from 4 to 300.

10. The process according to claim 1, wherein the producing or otherwise obtaining the fusion drawn glass laminate comprises producing or otherwise obtaining the fusion drawn glass laminate having a thickness T wherein the thickness T is between 100 μm to 2 mm.

11. The process according to claim 1, wherein the producing or otherwise obtaining the fusion drawn glass laminate comprises producing or otherwise obtaining the fusion drawn glass laminate having a thickness T wherein the thickness T is between 100 μm to 500 um such that the resulting planar waveguide structure is flexible.

12. The process according to claim 1, further comprising adding a layer of material over the remaining or thicker portions of the second clad glass layer, the material having an index contrast with the second clad glass layer.

13. The process according to claim 1, wherein the first planar waveguide pattern comprises at least one of a Y-branch, a star-coupler, a directional coupler, a Mach-Zehnder interferometer, a fan-out, a fan-in, an inverse waveguide taper, a waveguide taper, and an arrayed waveguide grating.

14. The process according to claim 1, further comprising placing or forming gratings in or on the remaining or thicker portions of the second clad glass layer.

15. A process for forming glass planar waveguide structure, the process comprising:

producing or otherwise obtaining a fusion drawn glass laminate comprising a core glass layer and a first clad glass layer and a second clad glass layer;

removing or thinning portions of the second clad glass layer leaving remaining or thicker portions of the second clad glass layer arranged in a first planar waveguide pattern; and removing portions of the first clad glass layer leaving remaining portions of the first clad glass layer arranged in a second planar waveguide pattern.

16. The process according to claim 15, wherein the removing portions of the first clad glass layer comprises etching V-grooves in alignment with one or more of the remaining or thicker portions of the first clad glass layer.

17. The process according to claim 15, wherein the producing or otherwise obtaining the fusion drawn glass laminate comprises producing or otherwise obtaining the fusion drawn glass laminate having a difference of index of refraction between the second clad glass layer and the core glass layer of in the range from 0.1 to 5%.

18. A process for forming glass planar waveguide structure, the process comprising:

producing or otherwise obtaining a fusion drawn glass laminate comprising a core glass layer and a first clad glass layer and a second clad glass layer;

removing or thinning portions of the second clad glass layer leaving remaining or thicker portions of the second clad glass layer arranged in a first planar waveguide pattern; and adding a layer of material over the remaining or thicker portions of the second clad glass layer, the material having an index contrast with the second clad glass layer.

19. The process according to claim 18, wherein the adding the layer of material comprises placing or forming gratings in or on the remaining or thicker portions of the second clad glass layer.

20. The process according to claim 18, wherein the producing or otherwise obtaining the fusion drawn glass laminate comprises producing or otherwise obtaining the fusion drawn glass laminate having a difference of index of refraction between the second clad glass layer and the core glass layer of in the range from 0.1 to 5%.

* * * * *

UNITED STATES PATENT AND TRADEMARK OFFICE
CERTIFICATE OF CORRECTION

PATENT NO. : 12,072,529 B2
APPLICATION NO. : 17/779395
DATED : August 27, 2024
INVENTOR(S) : Venkatesh Botu et al.

Page 1 of 1

It is certified that error appears in the above-identified patent and that said Letters Patent is hereby corrected as shown below:

On the Title Page

In Item (60) under Related U.S. Application Data insert --Provisional application No. 62/942130, filed November 30, 2019--

Signed and Sealed this
Twenty-fifth Day of March, 2025

Coke Morgan Stewart
*Acting Director of the United States Patent and Trademark Office*